US010378679B2

(12) United States Patent
Booth et al.

(10) Patent No.: US 10,378,679 B2
(45) Date of Patent: Aug. 13, 2019

(54) CLAMP

(71) Applicant: Ellis Patents Holdings Limited, York (GB)

(72) Inventors: Andrew Ward Booth, York (GB); Christopher John Calvert, York (GB)

(73) Assignee: Ellis Patents Holdings Limited, York (GB)

( * ) Notice: Subject to any disclaimer, the term of this patent is extended or adjusted under 35 U.S.C. 154(b) by 0 days.

(21) Appl. No.: 15/756,479

(22) PCT Filed: Sep. 9, 2016

(86) PCT No.: PCT/GB2016/052788
§ 371 (c)(1),
(2) Date: Feb. 28, 2018

(87) PCT Pub. No.: WO2017/046570
PCT Pub. Date: Mar. 23, 2017

(65) Prior Publication Data
US 2018/0266587 A1    Sep. 20, 2018

(30) Foreign Application Priority Data

Sep. 14, 2015    (GB) .................................. 1516237.3

(51) Int. Cl.
*F16L 3/00*    (2006.01)
*F16L 3/10*    (2006.01)
*H02G 3/32*    (2006.01)

(52) U.S. Cl.
CPC ............ *F16L 3/1091* (2013.01); *F16L 3/1075* (2013.01); *F16L 2201/20* (2013.01); *H02G 3/32* (2013.01)

(58) Field of Classification Search
CPC ... F16L 3/2235; F16L 3/06; F16L 3/01; F16L 3/221; F16L 3/12
(Continued)

(56) References Cited

U.S. PATENT DOCUMENTS 4,609,171 A * 9/1986 Matsui ...................... F16L 3/12
                                                      24/16 PB
4,840,345 A * 6/1989 Neil ......................... F16L 3/12
                                                      24/16 PB
(Continued)

FOREIGN PATENT DOCUMENTS

BE            412553 A       12/1935
CN        203348744 U       12/2013
(Continued)

OTHER PUBLICATIONS

The International Bureau of WIPO, Internaitonal Preliminary Report on Patentability for International Application No. PCT/GB2016/052788, dated Mar. 20, 2018, 7 pages, Switzerland.
(Continued)

*Primary Examiner* — Steven M Marsh
(74) *Attorney, Agent, or Firm* — Alston & Bird LLP

(57) ABSTRACT

A method and apparatus are disclosed for retaining at least one elongate object. The apparatus includes a first retaining member (702) comprising at least one female portion (712), a further retaining member (700) comprising at least one male portion (732) receivable in the at least one female portion, wherein the at least one male portion (732) comprises a first connecting region adapted to cooperate with a further connecting region and at least one securing element (785) slidable in a keyway (775) of the first retaining member (702) and engagable with said male portion (732) to securely connect the first and further retaining members and retain an elongate object therebetween.

18 Claims, 8 Drawing Sheets

(58) Field of Classification Search
USPC .......................... 248/65, 68.1, 73, 74.1, 74.4
See application file for complete search history.

(56) References Cited

U.S. PATENT DOCUMENTS

| | | | |
|---|---|---|---|
| 6,382,568 B1 | 5/2002 | Snell | |
| 6,525,273 B1 | 2/2003 | Cunningham | |
| 8,708,289 B2* | 4/2014 | Allenbach | F16L 3/2235 |
| | | | 248/68.1 |
| 8,850,669 B1 | 10/2014 | Klein et al. | |
| 8,882,072 B2* | 11/2014 | Hattori | B29C 45/006 |
| | | | 248/346.03 |
| 8,919,717 B2* | 12/2014 | Hauser | F16B 37/0842 |
| | | | 248/309.1 |
| 10,029,625 B1* | 7/2018 | Mejia Perez | B60R 13/0206 |
| 2005/0006535 A1 | 1/2005 | Brown et al. | |
| 2009/0119886 A1 | 5/2009 | Werth | |
| 2011/0303456 A1* | 12/2011 | Blanchard | F16L 3/1091 |
| | | | 174/480 |
| 2012/0217354 A1 | 8/2012 | Walraven et al. | |
| 2014/0103172 A1* | 4/2014 | Tazioli | F16L 3/1066 |
| | | | 248/74.4 |

FOREIGN PATENT DOCUMENTS

| | | |
|---|---|---|
| DE | 1643537 A1 | 7/1971 |
| DE | 10040736 A1 | 2/2002 |
| DE | 102014001161 A1 | 8/2015 |
| EP | 2003383 A2 | 12/2008 |
| FR | 1372603 A | 9/1964 |
| GB | 1570820 A | 7/1980 |
| GB | 2359112 A | 8/2001 |
| GB | 2486538 A | 6/2012 |

OTHER PUBLICATIONS

International Searching Authority, International Search Report and Written Opinion for International Application No. PCT/GB2016/052788, dated Nov. 18, 2016, 11 pages, European Patent Office, Netherlands.

Intellectual Property Office, Search Report for Application No. GB1516237.3, dated Feb. 29, 2016, 5 pages, United Kingdom.

* cited by examiner

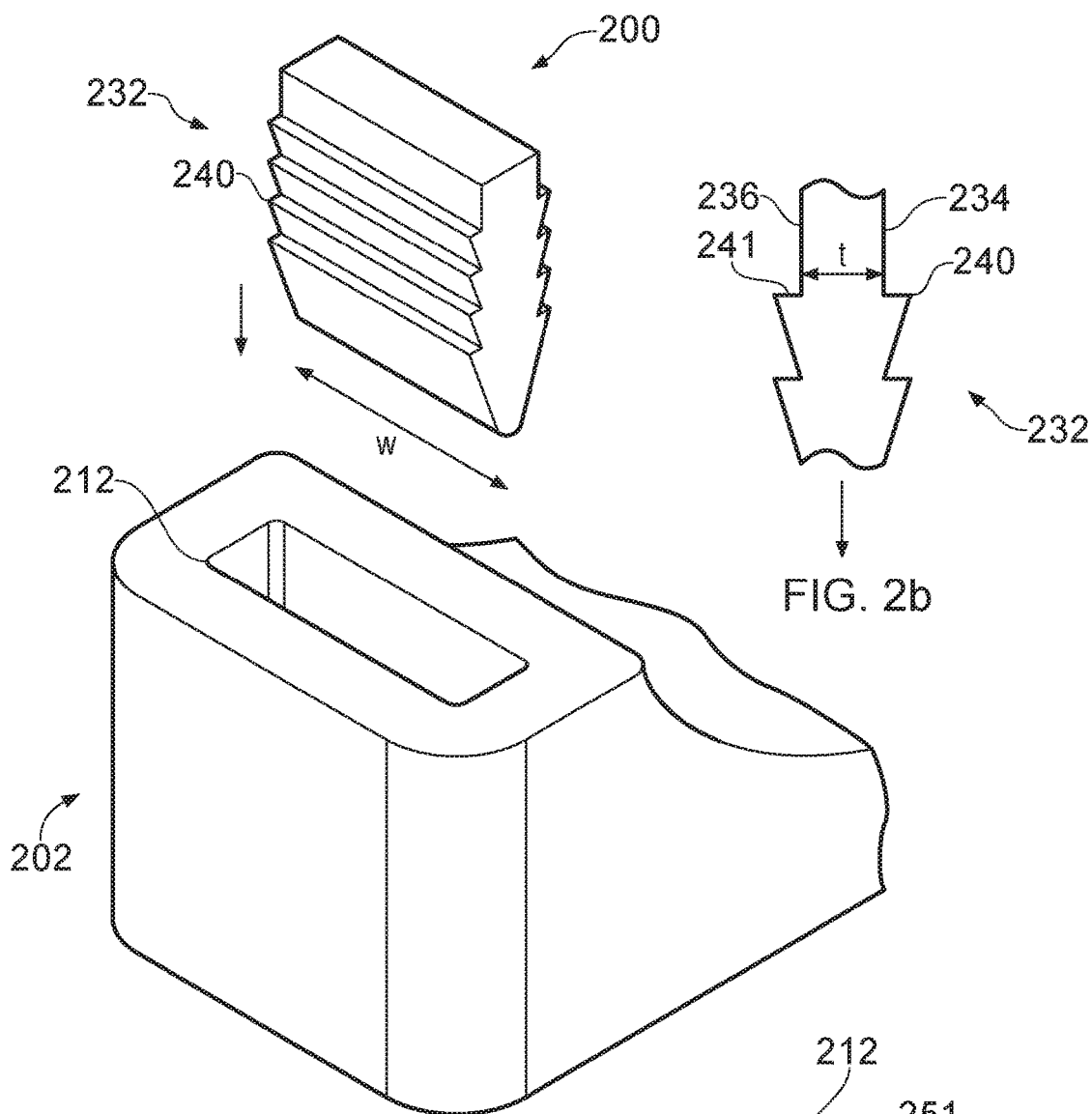
FIG. 2a
FIG. 2b
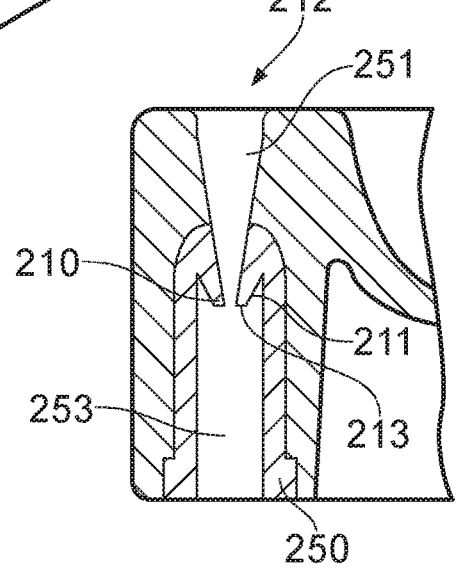
FIG. 2c

CLAMP

CROSS REFERENCE TO RELATED APPLICATIONS

This application is a National Stage Application, filed under 35 U.S.C. § 371, of International Application No. PCT/GB2016/052788, filed Sep. 9, 2016, which claims priority to United Kingdom Application No. 1516237.3, filed Sep. 14, 2015; the contents of both of which are hereby incorporated by reference in their entirety.

BACKGROUND

Related Field

The present invention relates to retaining elongate objects, such as electrical cables or pipes, in a desired location. In particular, but not exclusively, the present invention relates to clamping and guiding of electrical cables in a cable clamp.

Description of Related Art

When installing electrical cable in a building, plant, sub-station, tunnel or the like, cables have to be laid in a specific location, orientation and direction, particularly when the cable must navigate through small spaces and around corners. It is known to unwind cable from a drum and lay the cable on spaced apart clamps which are mounted to a suitable surface, such as a channel section secured to the ground. Each clamp consists of an upper half and a lower half and may have one or more rollers to help pull the cable through the clamp. Once in a desired location, the rollers may be removed and the cable drops on to the lower half of each clamp. The upper half of each clamp is then secured to the corresponding lower half of that clamp to securely retain the cable therein.

If the cable needs to be removed from the clamp, for repair or maintenance of the cable or clamp for example, the upper half of the clamp must be removed from the lower half of the clamp and the cable moved to a location outside the clamp. Conventionally, the upper and lower halves of each cleat are secured together by one or more bolts or studs which extend upwardly from the lower half of the clamp when the upper half of the clamp is removed. The cable is relatively resilient and after being removed from a clamp tends towards its original position in the clamp.

This is the case if the cable has been oriented in a straight line or around a corner or curve when located in the clamps. As a result of this tendency, the cable undesirably makes contact with the screw threads of the bolts or studs vertically extending from the lower half of the clamp. Movement of the cable relative to the threaded bolts causes the protective and insulating outer layer of the cable to wear and its integrity to be ultimately compromised. Direct contact of the copper conductors with the threaded bolts causes an electrical short-circuit which can be fatal.

BRIEF SUMMARY

It is an aim of the present invention to at least partly mitigate the above-mentioned problems.

It is an aim of certain embodiments of the present invention to provide a method and apparatus for retaining one or more cables in a secure manner which allows a cable/s to be removed from the apparatus and located safely with respect to the apparatus during maintenance and repair such that the risk of the cable/s being damaged, and in turn a short-circuit event occurring, is significantly reduced and even eliminated.

It is an aim of certain embodiments of the present invention to provide a method and apparatus for retaining one or more cables in a quick and easy manner which requires no or minimal tooling and can be carried out with one hand and whilst wearing gloves.

It is an aim of certain embodiments of the present invention to provide a lightweight and inexpensive clamp for securely retaining one or more cables or pipes of various diameters in a single, double or trefoil arrangement, or an arrangement having more than three cables or pipes.

According to a first aspect of the present invention there is provided a first retaining member comprising at least one female portion;
  a further retaining member comprising at least one male portion receivable in the at least one female portion, wherein the at least one male portion comprises a first connecting region adapted to cooperate with a further connecting region; and
  at least one securing element slidable in a keyway of the first retaining member and engagable with said male portion to securely connect the first and further retaining members and retain an elongate object therebetween.

Aptly the first connecting region comprises at least a one of at least one protrusion and at least one recess, and the further connecting region comprises at least a remainder one of the at least one protrusion and the at least one recess.

Aptly first and further connecting regions each comprise at least one tooth-like element.

Aptly each tooth-like element is substantially barb-like to securely connect the first and further retaining members together.

Aptly at least a portion of at least one of the male portion and female portion is substantially resilient.

Aptly one of the first and further connecting regions is substantially resilient.

Aptly the apparatus further comprises each said female portion comprises a slot like passageway in the first retaining member and each male portion comprises a finger portion of the further retaining member.

Aptly the apparatus further comprises each keyway of the first retaining member extends at least partially through the first retaining member.

Aptly the apparatus further comprises each securing element comprises an elongate keeper element insertable into a respective keyway.

Aptly the apparatus further comprises a leading end region of an elongate keeper element is tapered and includes at least one longitudinal orientated elongate barbed finger.

Aptly the apparatus further comprises each keeper element comprises projections extending substantially along a length of the keeper element and a leading edge region of each extending projection is tapered.

Aptly the apparatus further comprises each keeper element comprises a handle region locatable in a scalloped portion of the first retaining member.

Aptly the apparatus further comprises each keeper element comprises a further connecting region for co-operating with a first connecting region of a respective male portion of the further retaining member to securely connect the first and further retaining members together.

Aptly each keyway extends into the first retaining member in a direction substantially parallel with an elongate object located between the first and further retaining members.

Aptly the at least one female portion comprises a first female portion disposed at a first side region of the first retaining member and a further female portion disposed at a further side region of the first retaining member, and wherein the at least one male portion comprises a first male disposed at a first side region of the further retaining member and a further male portion disposed at a further side region of the further retaining member.

Aptly at least one of the first and further retaining members is attachable to a mountable surface.

According to a second aspect of the present invention there is provided a method of retaining at least one elongate object comprising the steps of:
locating an elongate object on a one of a first retaining member comprising at least one female portion or a further retaining member comprising at least one male portion;
locating a remainder one of the first or further retaining members over the elongate object and said a one retaining member whereby each male portion of the retaining member is inserted into a respective female portion of the first retaining member; and
sliding at least one securing element along a keyway of said first retaining member thereby engaging a connecting region of the securing element with a first connecting region of a respective male portion of the further retaining member and securely connecting the first and further retaining members together and retaining said elongate object therebetween.

Aptly the method further comprises sliding a leading end region of an elongate keeper element, comprising said securing element, through an opening in the first retaining member defined by an end of a respective keyway.

Aptly the method further comprises inserting the keeper element into the keyway until barbed fingers at an end region of the keeper element engage into corresponding recesses in an end region of the keyway distal to said opening.

Aptly the method further comprises inserting the keeper element into the keyway until a handle region of the keeper element is received in a respective scalloped portion of the retaining member.

According to a third aspect of the present invention there is provided a method substantially as hereinbefore described with reference to the accompanying drawings.

According to a fourth aspect of the present invention there is provided apparatus constructed and arranged substantially as hereinbefore described with reference to the accompanying drawings.

According to a fifth aspect of the present invention there is provided apparatus for retaining at least one elongate object, comprising:
a first retaining member comprising at least one female portion; and
a further retaining member comprising at least one male portion receivable in the at least one female portion;
wherein the at least one male portion comprises a first connecting region adapted to cooperate with a further connecting region located in the at least one female portion to connect the first and further retaining members together and retain an elongate object therebetween.

Aptly, the first connecting region comprises at least a one of at least one protrusion and at least one recess, and the further connecting region comprises at least a remainder one of the at least one protrusion and the at least one recess.

Aptly, the first and further connecting regions each comprise at least one tooth-like element.

Aptly, each tooth-like element is substantially barb-like to securely connect the first and further retaining members together.

Aptly, at least a portion of at least one of the male portion and female portion is substantially resilient.

Aptly, a one of the first and further connecting regions is substantially resilient.

Aptly, the first connecting region comprises at least one substantially rigid element extending from an outer surface of the male portion, and the further connecting region comprises at least one substantially resilient element extending from an inner surface of the female portion.

Aptly, the inner surface is defined by a substantially cylindrical bore in the female portion.

Aptly, the at least one substantially rigid element comprises a plurality of longitudinally spaced apart annular barb-like elements.

Aptly, the at least one substantially resilient element comprises a plurality of radially spaced apart barb-like elements.

Aptly, the at least one female portion comprises a substantially slotted passageway and the male portion is correspondingly shaped for insertion into the slotted passageway.

Aptly, at least an inner surface of the slotted passageway comprises the further connecting region.

Aptly, the female portion further comprises a substantially open outer side region that defines spaced apart flanges of the slotted passageway, each flange adapted to locate the male portion in the slotted passageway of the female portion.

Aptly, the female portion further comprises at least one aperture in communication with the slotted passageway.

Aptly, the at least one aperture is orientated substantially perpendicularly to the slotted passageway.

Aptly, the male portion comprises a through hole alignable with the at least one aperture for receiving a correspondingly shaped securing element to securely connect the first and second retaining members together.

Aptly, the securing element comprises a peg or screw.

Aptly, the at least one aperture comprises a substantially slotted keyway extending into the first retaining member in a direction substantially parallel with an elongate object locatable between the first and further retaining members.

Aptly, the substantially slotted keyway is adapted to receive a correspondingly shaped securing element that comprises the further connecting region for cooperating with the first connecting region of the male portion to securely connect the first and further retaining members together.

Aptly, the first and further connecting regions each comprise a set of cooperable teeth-like elements.

Aptly, the slotted keyway defines an opening in the female portion and comprises at least one scalloped region proximal said opening for gripping the securing element when located in the slotted keyway.

Aptly, the securing element further comprises a handle region for moving the securing element relative to the slotted keyway, said handle region being locatable in the at least one scalloped region.

Aptly, the securing element comprises at least one tapered end region to aid insertion of the securing element into the slotted keyway.

Aptly, the handle region comprises at least one tapered edge region adapted to abut with a correspondingly tapered edge region of the scalloped region responsive to the first and further retaining members being urged apart in use such that the first and further connecting regions are urged together.

Aptly, the at least one male portion comprises a tapered end region to aid insertion of said male portion into the at least one female portion.

Aptly, the at least one female portion is disposed at a first side region of the first retaining member and the at least one male portion is disposed at a corresponding first side region of the further retaining member.

Aptly, a further side region of the first retaining member comprises a first hinge portion and a corresponding further side region of the further retaining member comprises a further hinge portion engageable with the first hinge portion to define a hinge axis about which the first and further retaining members are rotatable.

Aptly, the first hinge portion comprises at least one channel and the further hinge portion comprises at least one hinge axle locatable in the at least one channel.

Aptly, the hinge axle and at least one channel are oriented substantially parallel with an elongate object locatable between the first and further retaining members.

Aptly, the at least one female portion comprises a first female portion disposed at a first side region of the first retaining member and a further female portion disposed at a further side region of the first retaining member, and wherein the at least one male portion comprises a first male portion disposed at a first side region of the further retaining member and a further male portion disposed at a further side region of the further retaining member.

Aptly, the at least one female and male portions are disposed centrally on the first and further retaining members respectively.

Aptly, each retaining member comprises at least two elongate object support surfaces and the at least one female and male portions are respectively disposed between the at least two elongate object support surfaces.

Aptly, at least one of the first and further retaining members is attachable to a mounting surface.

According to a sixth aspect of the present invention there is provided a kit of parts for retaining at least one elongate object, comprising:
- a first retaining member comprising at least one female portion;
- a further retaining member comprising at least one male portion receivable in the at least one female portion, wherein the at least one male portion comprises a first connecting region adapted to cooperate with a further connecting region located in the at least one female portion; and
- at least one securing element engagable with the male portion to securely connect the first and further retaining members together and retain an elongate object therebetween.

According to a seventh aspect of the present invention there is provided a method for retaining at least one elongate object, comprising:
- locating an elongate object on a first retaining member comprising at least one female portion; and
- inserting at least one male portion of a further retaining member into the at least one female portion;
- wherein the at least one male portion comprises a first connecting region adapted to cooperate with a further connecting region located in the at least one female portion to connect the first and further retaining members together and retain the elongate object therebetween.

Aptly, the method further comprises:
engaging a securing element with the male portion to securely connect the first and further retaining members together.

Aptly, the method further comprises:
inserting the securing element through a hole in the male portion and into an aperture of the first retaining member, wherein the securing element comprises a peg or screw.

Aptly, the method further comprises:
locating the securing element in a substantially slotted keyway disposed in the first retaining member, wherein the securing element comprises the further connecting region that cooperates with the first connecting region of the male portion to securely connect the first and further retaining members together.

Aptly, the method further comprises:
engaging at least one protrusion of the first connecting region with at least one recess of the further connecting region.

Certain embodiments of the present invention may therefore provide a boltless clamp for retaining one or more cables or pipes in a quick and easy manner. The clamp is lightweight and includes a minimum number of components. The tooth-like ratchet arrangement of the clamp according to certain embodiments of the present invention allows the clamp portions to be securely connected together around a cable/s or pipe/s in an incremental, tactile and audible manner. The clamp portions may be permanently connected or may be selectively disconnected from each other as desired. The clamp according to certain embodiments of the present invention may be used as a guide for feeding cables through a number of clamps and into a desired position and/or orientation before the clamp/s are closed to securely retain the cable in position.

BRIEF DESCRIPTION OF THE FIGURES

Embodiments of the present invention will now be described hereinafter, by way of example only, with reference to the accompanying drawings in which:

FIGS. 2a to 2c illustrate a clamp according to a further embodiment of the present invention;

DETAILED DESCRIPTION OF VARIOUS EMBODIMENTS

Figure 1A:
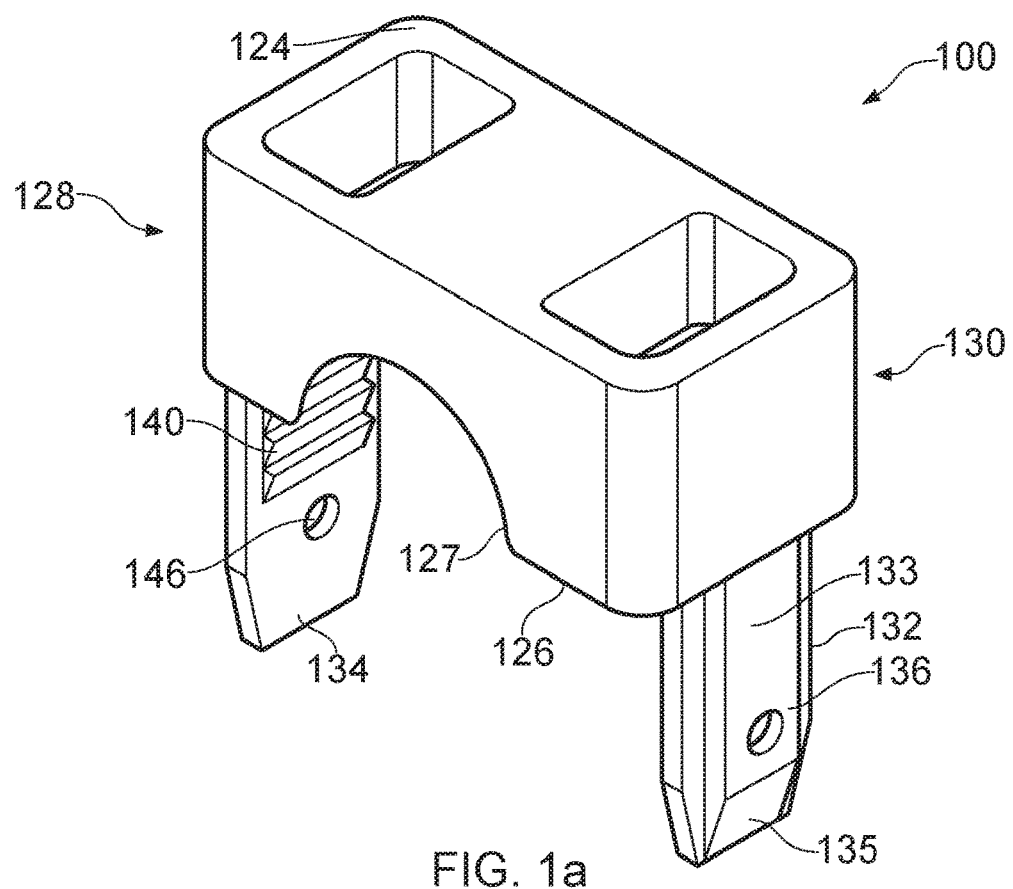
FIGS. 1a to 1c illustrate a clamp according to a first embodiment of the present invention.

In the drawings like reference numerals refer to like parts.

Figure 1B:
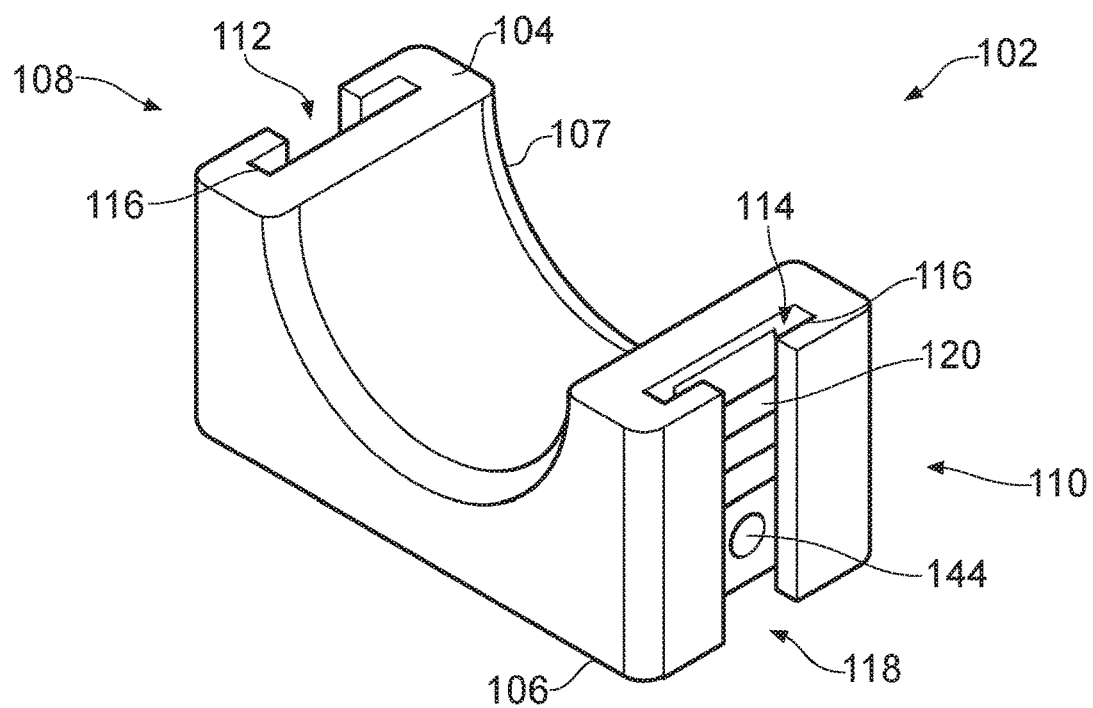
Figure 1C:
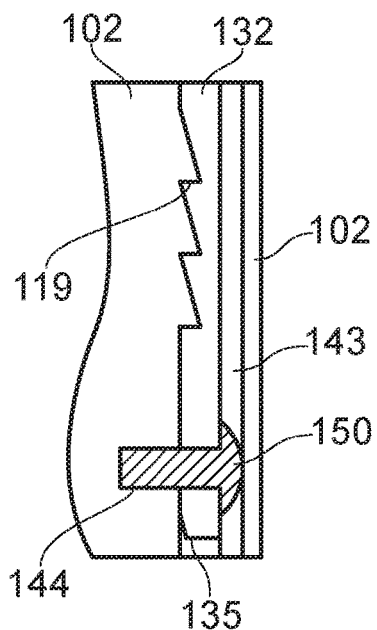

FIGS. 1a to 1c illustrate upper and lower clamp portions 100,102 of a 'boltless' cable clamp according to certain embodiments of the present invention. The upper and lower clamp portions 100,102 are each a one-piece moulding or casting of a suitable material such as a plastics material, e.g.

nylon, polypropylene, polyethylene or the like, or a metal material, e.g. aluminium, steel or the like. Alternatively, the upper and lower clamp portions may be formed from a plastics material moulded around an inner metal core/skeleton for additional strength. One or more regions of the upper and lower clamp portions 100,102 may be cored out to define recesses where material and thus weight and cost can be reduced.

As shown in FIG. 1*b*, the lower clamp portion 102 has substantially flat and parallel upper and lower surfaces 104,106. The lower surface 106 engages, in use, with a suitable mounting surface, such as an upper surface of an elongate channel section (not shown). The upper surface 104 engages in use with a substantially flat lower surface of the upper clamp portion 100, as shown in FIG. 1*a*. The lower clamp portion 102 includes a substantially curved cable support surface 107 located centrally between side regions 108,110 of the lower cable portion. The end regions of the cable support surface 107 include a radius so as not to induce any localised stresses on a cable located in the clamp particularly if the clamp is moveable in a downward direction against the lower clamp portion. Each side region 108,110 includes a substantially slotted passageway 112 having an inner surface 114 and two spaced apart outer surfaces 116 defined by an opening 118 in an outer region of the passageway. The terms 'inner' and 'outer' as used herein are with reference to a central axis of the cable portion which a cable when located in the clamp is parallel with. The passageway 112 defines a female portion of the lower clamp portion 102 for receiving a male portion of the upper clamp portion 100 as described further below. The inner and outer surfaces 114,116 of each passageway 112 help to guide and support the male portion of the upper clamp portion 100 when received in the passageway 112 of the female portion. The inner surface 114 of each passageway 112 includes a plurality of elongate teeth-like projections 120 which extend at least partially across the inner surface 114 of the passageway 112 and substantially downwardly to define an overhang region 119, as best shown in FIG. 1*c*.

As shown in FIG. 1*a*, the upper clamp portion 100 includes substantially flat upper and lower surfaces 124,126 and side regions 128,130. The upper clamp portion 100 includes a substantially curved cable support surface 127 located centrally between the side regions 128,130 of the upper cable portion. The end regions of the cable support surface 127 include a radius so as not to induce any localised stresses on a cable located in the clamp particularly if the clamp is moveable in an upward direction against the upper clamp portion. Each side region 128,130 includes a downwardly extending finger 132 that defines a male portion of the upper clamp portion 100.

Each finger 132 is substantially resilient and has an inner surface 134 and an outer surface 136. The term 'resilient' will be understood to mean each finger is flexible enough to move away from an original position when a lateral force for example is applied to the finger, whilst being substantially resilient such that the finger returns towards its original position when the force is reduced or removed.

Each finger 132 is sized to slideably insert into a corresponding one of the slotted passageways 112. Each finger 132 has an elongate rib 133 extending along the outer surface to add strength to the finger whilst also corresponding in width with the opening 118 of the passageway 112 in the lower clamp portion 102 to help guide each finger 132 into its corresponding passageway 112 and provide a flush outer side region 108,110 when the two clamp portions 100,102 are connected together. A leading end 135 of each finger 132 is tapered to allow for ease of insertion into the corresponding passageways 112 of the lower clamp portion 102.

The inner surface 134 of each finger 132 includes a plurality of teeth-like projections 140 which each extend at least partially across the inner surface 134 of the finger 132 and substantially upwardly to define a ledge region 141, as best shown in FIG. 1*c*. The teeth-like projections 140 of each finger 132 of the upper clamp portion 100 correspondingly engage with the teeth-like projections 120 of the corresponding passageway 112 of the lower clamp portion 102 such that the tapered projections 140 of the upper clamp portion 100 can pass over the tapered projections 120 of the lower clamp portion 102 when each finger 132 is slidably inserted into its corresponding passageway 112, whilst preventing each finger 132 moving upwardly and out of its corresponding passageway 112 to securely connect the two clamp portions 100,102 together. This arrangement provides a form of ratchet mechanism for securely connecting the clamp portions together. Of course, each tooth-like projection 120,140 may take any suitable form and cross section, such as a substantially square 'dog-tooth' profile, triangular, curved, or the like. In a similar manner, each finger 132 of the upper clamp portion 100 may include a single projection that engages with a corresponding recess in the passageway 112 of the lower clamp portion 102, or vice versa, to provide for the secure boltless' connection of the clamp portions 100, 102. In addition, the number of projections on the fingers 132 and in the passageways 112 and the size and profile of each projection may be predetermined to provide the desired ratcheting effect. For example, each passageway 112 may have four projections, wherein each projection has a dimension in a direction that is substantially along the passageway of about around 1 mm, thereby providing a range between the upper and lower clamp portions 100,102 of about around 4 mm in about around 1 mm increments. Of course, the fingers 132 may each comprise one or more projections to engage with the projection/s in a corresponding passageway 112, or the fingers 132 may each have the same number and equally sized and arranged projections as the corresponding passageway 112. In an exemplary embodiment of the present invention, each projection 120,140 on each finger 132 and corresponding passageway 112 may have a length of about around 30-40 mm and the angled face of each toothed projection may provide a range of about around 8-10 mm in increments of about around 0.5-1 mm to accommodate different cable diameters.

As shown in FIG. 1*c*, a spacing 143 between the inner and outer surfaces 114,116 of the slotted passageway 112 in the lower clamp portion 102 uniformly increases in the downward direction from the upper surface 104 to the lower surface 106 of the lower clamp portion 102 to allow each respective resilient finger 132 of the upper clamp portion 100 to move outwardly when moved over the corresponding projections 120 of the lower clamp portion 102. The projections 120, 140 are arranged such that when the lower surface 126 of the upper clamp portion 100 abuts the upper surface 104 of the lower clamp portion 102, the projections 140 of the fingers 132 snap into secure engagement with the projections 120 of the corresponding passageways 112, as shown in FIG. 1*c*, to securely connect the clamp portions 100,102 together.

Each slotted passageway 112 of the lower clamp portion 102 includes an inwardly extending bore 144 located below the plurality of projections 120 in the passageway. Each finger 132 includes a through bore 146 located below the plurality of projections 140 on the finger and alignable with the bore 144 when the upper and lower clamp portions 100,102 are in abutment and connected together. A securing element 150 is configured to extend through the bore 146 of the finger 132 and into the bore 144 of the lower clamp portion 102 to add security to the connection between each passageway 112 and corresponding finger 132 of the clamp portions 100,102. The securing element 150 and bores 144,146 have a circular cross section but may have any suitable profile and cross section, such that the securing element 150 may be a peg, screw, tab, insert, or the like, and the bore 146 may be threaded or non-threaded.

Each passageway 112 is shown as extending all the way through the lower clamp portion 102. This may allow a finger nail or tool to access the leading end 135 of each finger 132 and urge the finger away from the passageway projections 120 in order to disconnect the upper clamp portion 100 from the lower clamp portion 102. Alternatively, the passageways 112 may not extend wholly through the lower clamp portion 102 to render the connection formed between the clamp portions a permanent one.

Figure 1D:
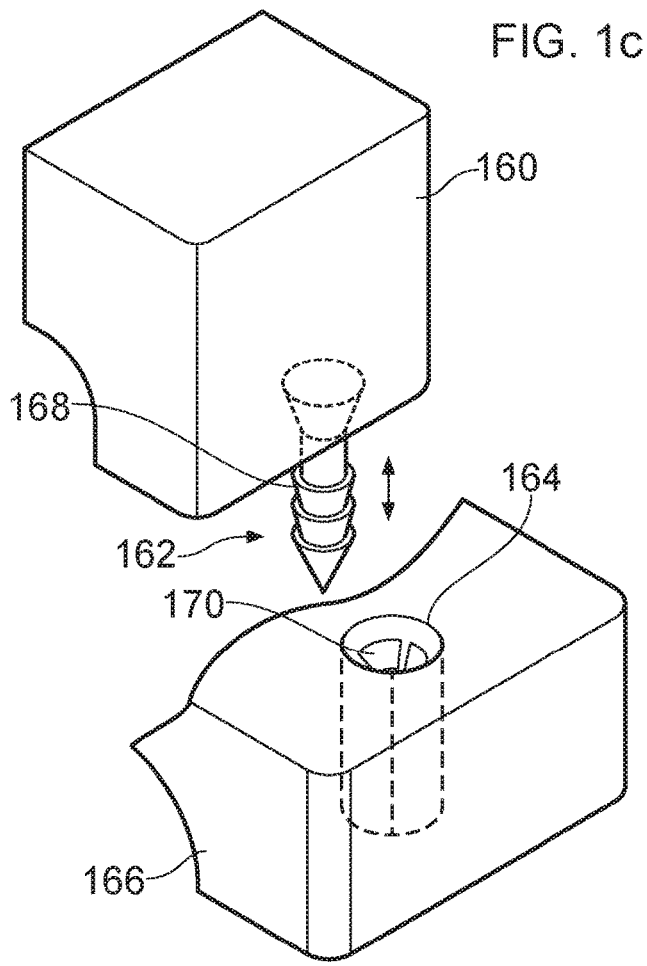
FIGS. 1d and 1e illustrate a clamp according to a further embodiment of the present invention.
Figure 1E:
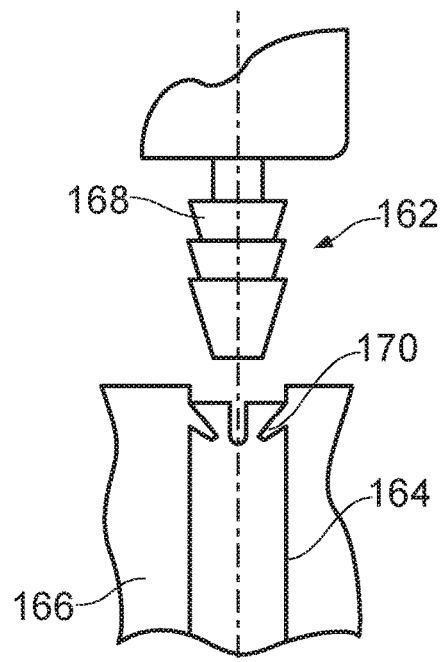

The cross section and profile of the fingers and passageways may be any suitable shape other than rectangular and slotted, e.g. circular, square or the like. Furthermore, the engagement between each finger 132 and a corresponding passageway 112 may substantially replicate a dove-tail or mortice and tenon joint, or the like. For example, as shown in FIG. 1*d*, the upper clamp portion 160 includes a substantially cylindrical finger 162 at each side region of the clamp portion that is received into a correspondingly shaped passageway 164 of the lower clamp portion 166. The finger 162 includes three annular teeth-like projections 168 arranged along the finger 162 which engage with a set of projecting portions 170 located in the passageway 164. The projections 170 are substantially resilient to allow the finger 162 to move into the passageway whilst preventing the finger from being removed from the passageway in the opposite direction. This arrangement, like the other above described ratchet-like arrangement, allows a user to securely connect the clamp portions together in an incremental, audible and tactile manner without the use of threaded bolts or studs. The main body of the finger 162 is about around 10 mm in diameter and each toothed projection 168 has a height of about around 2 mm and a midpoint diameter of about around 11 mm. The passageway 164 has a diameter of about around 12.5 mm and the ends of the projections 170 define a central opening having a diameter of about around 9.8 mm. The projections 170 are spaced apart circular segments oriented substantially downwardly in the passageway. The illustrated embodiment shows four spaced apart projections 170 each having an angle of about around 60-80 degrees. However, the projections 168,170 may be any suitable configuration to provide the ratchet-like mechanism for securely connecting the clamp portions together.

FIGS. 2*a* to 2*c* illustrate upper and lower clamp portions 200,202 of a boltless' cable clamp according to certain other embodiments of the present invention. As shown in FIGS. 2*a* and 2*b*, each finger 232 of the upper clamp portion 200 includes a set of teeth-like projections 240 on both of its inner and outer surfaces 234,236. Each finger has a thickness t of about around 5 mm and a width w of about around 40 mm. Each tooth-like projection 240 defines an upper ledge surface 241 that extends outwardly from its respective surface 234,236 by about around 1.5 mm. Each projection 240 is about around 2 mm high. The uppermost tooth-projection in FIG. 2*a* may correspond to a cable diameter of about around 50 mm and the lowermost tooth-projection in FIG. 2*a* may correspond to a cable diameter of about around 44 mm when the upper clamp portion 200 is connected with the lower clamp portion 202.

As illustrated in FIGS. 2*a* and 2*c*, the lower clamp portion 202 includes a slotted passageway 212 to define a female portion for receiving the 'male' fingers 232 of the upper clamp portion 200. Each slotted passageway 212 defines an opening in the upper surface 204 that has a longitudinal dimension (that is substantially parallel with a cable located in the clamp) of about around 41 mm and a lateral dimension (that is substantially perpendicular to a cable located in the clamp) of about around 5.5 mm for receiving a corresponding one of the fingers 232. As shown in FIG. 2*c*, each passageway 212 includes an insert 250 that defines a lower portion 253 of the passageway. The insert 250 includes a pair of inwardly extending projections 210 that are located on opposite surfaces of the passageway 212. Each projection 210 tapers inwardly to continue a tapered upper portion 251 of the passageway 212 and defines an overhang 211 and an engagement surface 213 for engagement with a ledge surface 241 of a corresponding finger 232. The lower extremities of each projection 210 are spaced apart by about around 5 mm to allow the finger 232 to extend into the passageway 212 whilst causing engagement of the projections 210,240. Aptly, the finger projections 240 or the insert projections 210 are substantially resilient to provide the desired ratcheting arrangement to securely connect the clamp portions 200,202 together. The insert 250 may be made from the same material as the main body of the lower clamp portion 202 or may be a different material. For example, the main body of the lower clamp portion 202 may be a plastics material that allows the finger projections 240 to be substantially resilient and the insert may be a metals material that allows the insert projections 210 to be substantially rigid. Again, the profile and cross section of the fingers and passageways and inserts may be other than substantially rectangular and slotted, and may aptly be substantially circular, square or the like. In a similar manner, the projections 210,240 may be any suitable profile and cross section, such as square, curved or triangular, and the number, size and arrangement of the finger projections 240 and insert projections 210 can be selected accordingly.

Figures 3A, 3B:
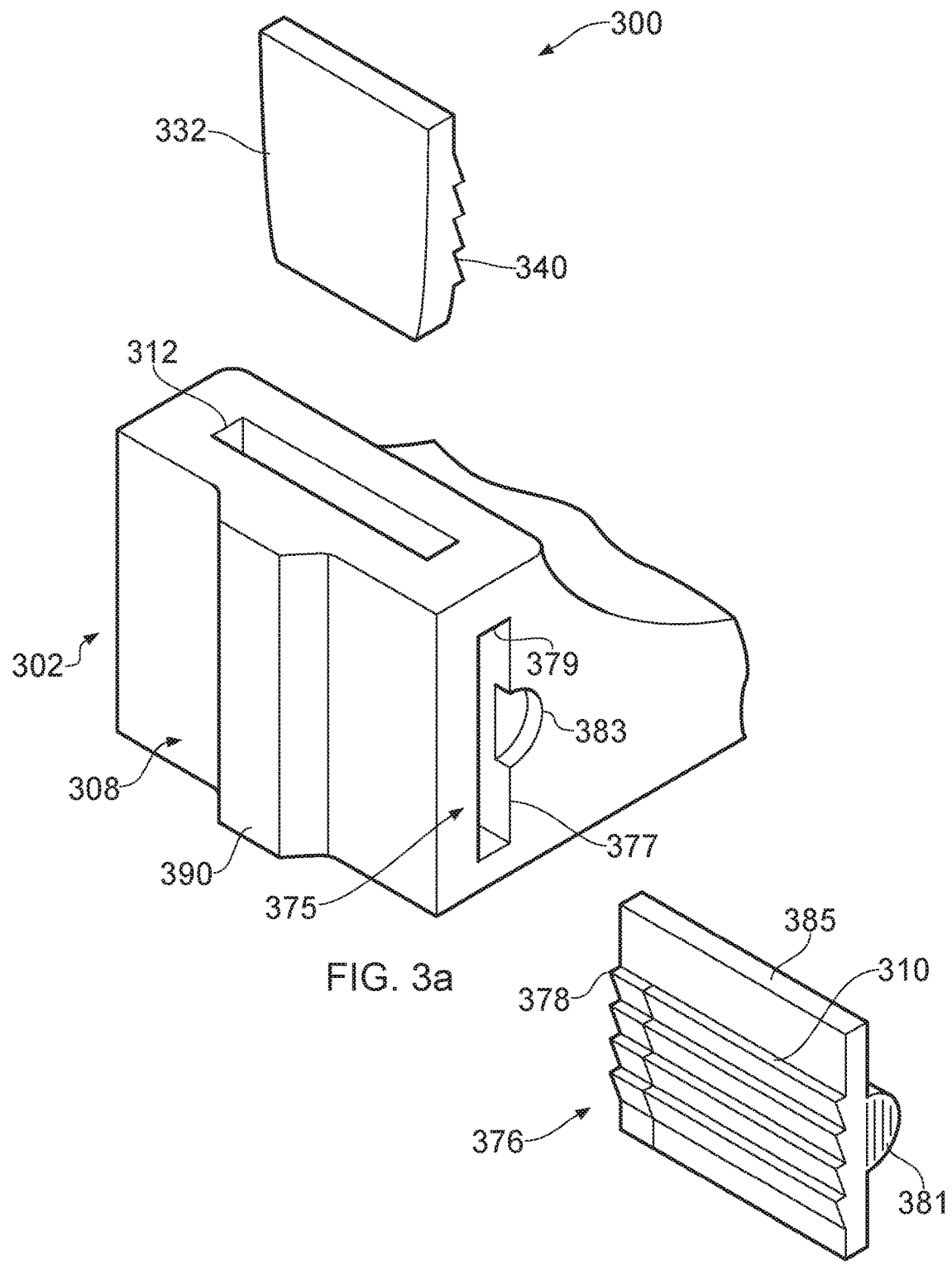
FIGS. 3a and 3b illustrate a clamp according to a further embodiment of the present invention.

As illustrated in FIGS. 3*a* and 3*b*, the lower clamp portion 302 includes a slotted keyway 375 at each end region that is oriented substantially in parallel with a cable locatable in the clamp such that the slotted keyway intersects the vertically oriented slotted passageway 312. Each slotted keyway 375 defines an opening 377 in the end of the lower clamp portion 302 and is configured to slideably receive a keeper element 385 as shown in FIG. 3*b*. Each keeper element 385 has a plurality of tooth-like projections 310 that are configured to engage with the tooth-like projections 340 of a corresponding one of the fingers 332. After each finger 332 of the upper clamp portion 300 has been inserted into its respective passageway 312 of the lower clamp portion 302, the keeper elements 385 are each inserted into a corresponding one of the keyways 375. A leading end region 376 of each keeper element 385 is tapered to aid insertion of the keeper element into its corresponding keyway 375. Likewise, a leading end region 378 of each elongate barb-like projection 310 may also be tapered to aid insertion and engagement with the finger projections 340. Each keyway 375 may fully extend through the lower clamp portion 302 to define a slotted opening 377 at each end region of the lower clamp portion. Each opening 377 provides an upper surface 379 for the keeper element 385 to abut with and to resist an upward force (caused by upward movement of a cable located in the clamp and/or a reaction force in view of a compression force on a cable located in the clamp) that tends to urge the clamp portions apart. This arrangement thereby securely retains each finger 332 in its corresponding passageway 312 and securely connects the clamp portions together. Instead of tapered barb-like projections 310,340 as shown in FIG. 3b, the projections of the keeper element 385 and fingers 332 may be substantially dog-tooth projections having a substantially square cross section to allow the keeper element 385 to be universally insertable in either end opening 377 of the lower clamp portion. A keeper element 385 and fingers 332 having symmetric projections, such as a dog-tooth profile, would allow for a single form of keeper element 385 which can be inserted in either keyway 375 by simply rotating the keeper element about its longitudinal axis by 180 degrees.

As shown in FIG. 3b, the keeper element 385 may include a handle region 381, such as a thumb push region, for moving the keeper element and the lower clamp portion 302 may include a scalloped portion 383 proximal the opening 377 for receiving the handle region 381 of the keeper element 385 when inserted into the keyway 375. This arrangement provides a flush end surface to the lower clamp portion when the clamp portions are securely connected together. The scalloped region 383 may be slightly larger than the handle region 381 to allow a tool or a fingernail, for example, to be used to withdraw the keeper element 385 from the keyway 375. Additionally or alternatively, the keeper element 385 may include an upstanding portion (not shown) that is engageable with a tool, such as a pair of pliers, to pull the keeper element 385 from the keyway 375. Therefore, as shown in FIGS. 3a and 3b, certain embodiments of the present invention thus provide a boltless clamp that may be easily and quickly connected together and disconnected as desired.

As illustrated in FIG. 3a, each side region 308 of the lower clamp portion 302 includes a vertically oriented rib portion 390 to add strength and stiffness to the lower clamp portion particularly around female portion.

Figure 4A:
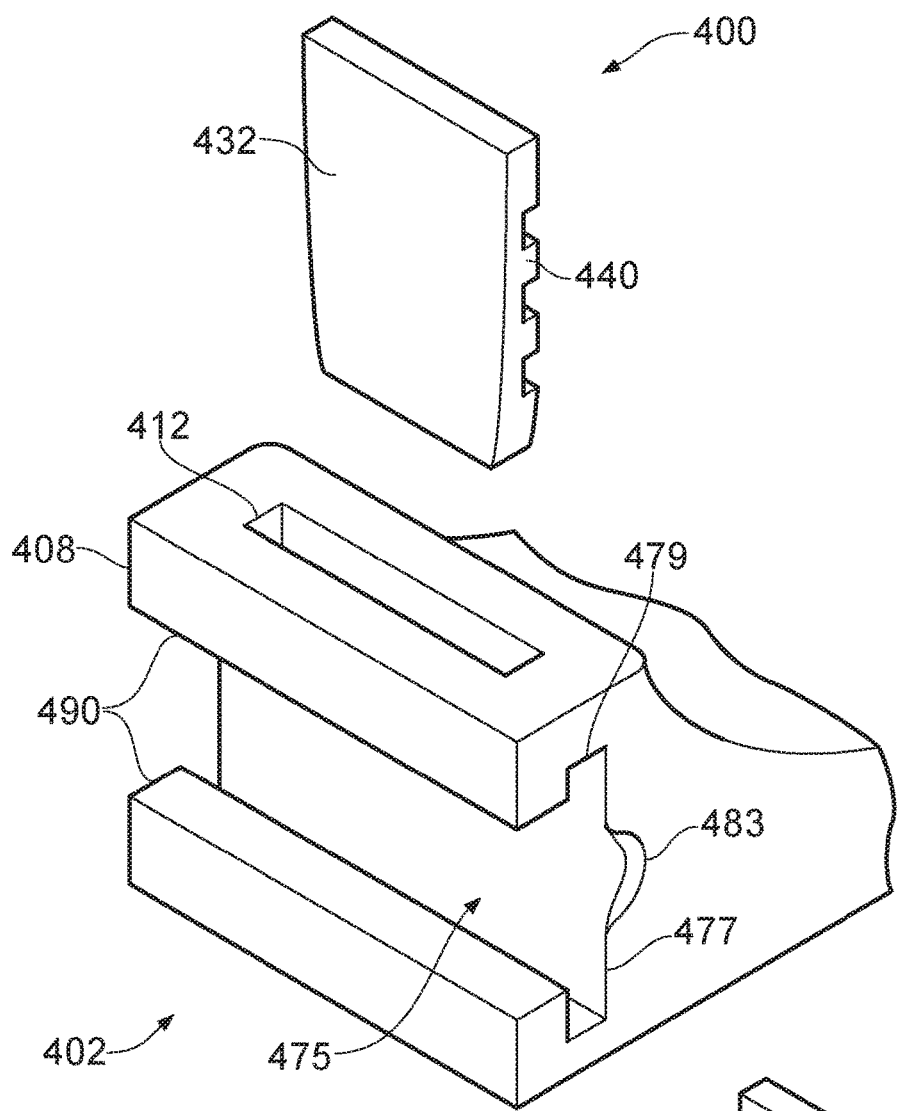
FIGS. 4a and 4b illustrate a clamp according to a further embodiment of the present invention.
Figure 4B:
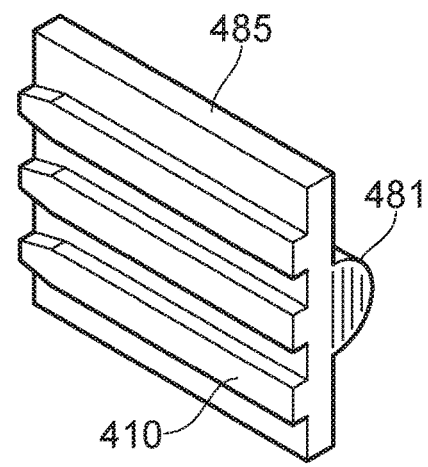

Alternatively, as illustrated in FIGS. 4a and 4b, each side region 408 may be substantially open to define opposed lip portions 490. Each lip portion 490 supports and guides the keeper element 485 into the corresponding keyway 475 whilst allowing material, and therefore cost and weight, to be reduced. The keeper element 485 as shown in FIG. 4b has dog-tooth projections 410 that engage with correspondingly shaped and sized projections 440 of each finger 432. The projections 440 may of course extend from a surface of the finger 432 or may be formed by recesses formed in a surface of the finger. The same applies for the keeper element 485. The keeper projections 410 have tapered leading end regions 489 to aid insertion into its respective keyway 475. The keeper element 485 has a handle region 481 which is receivable in a correspondingly sized scalloped portion 483 to provide a flush end surface of the lower clamp portion 402 when the clamp portions are securely connected together. In a similar manner to the embodiment shown in FIGS. 3a and 3b, the keyway 475 fully extends through the lower clamp portion 402 to define a slotted opening 477 on each end of the lower clamp portion. Each opening 477 provides an upper surface 479 for the keeper element 485 to abut with and to resist an upward force (caused by upward movement of a cable located in the clamp and/or a reaction force in view of a compression force on a cable located in the clamp) that tends to urge the clamp portions apart. This arrangement thereby securely retains each finger 432 in its corresponding passageway 412 and connects the clamp portions together.

Figure 5A:
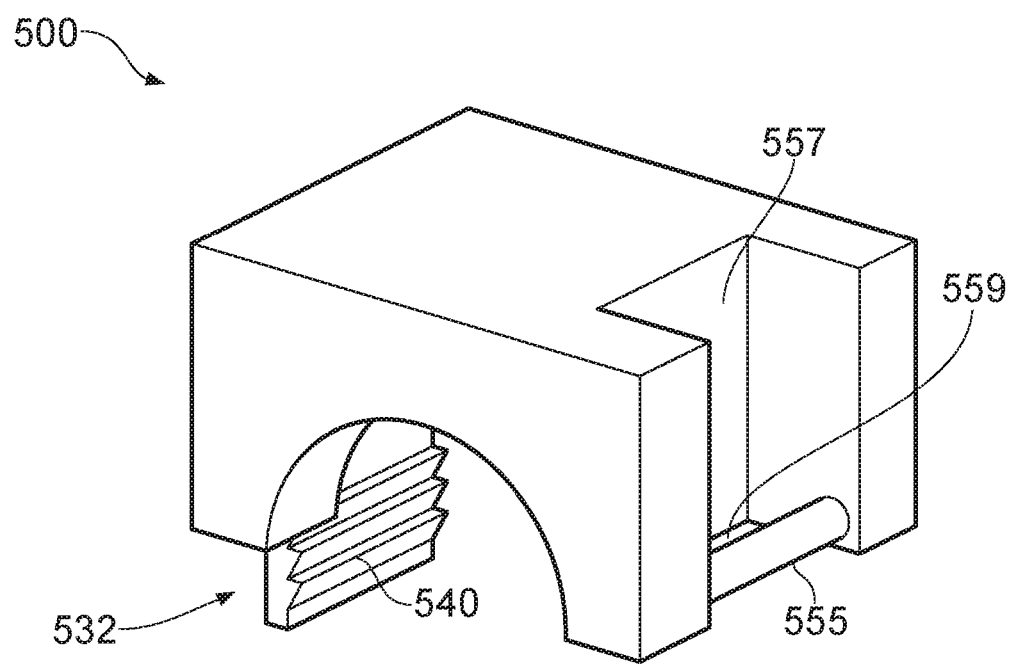
FIGS. 5a and 5b illustrate a clamp according to a further embodiment of the present invention.
Figure 5B:
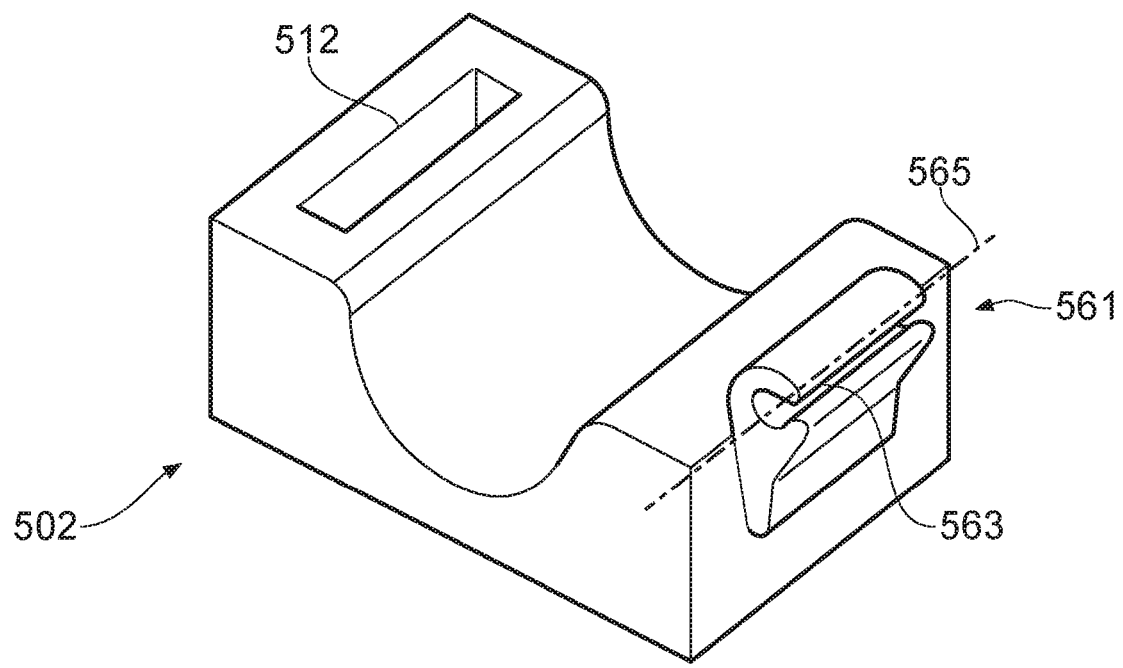

A further embodiment of the present invention is illustrated in FIGS. 5a to 5b. The lower clamp portion 502 includes a slotted passageway 512 for receiving a correspondingly shaped finger portion 532 of the upper clamp portion 500. An inner surface of the finger portion 532 includes rows of elongate tooth-like projections 540 that extend fully across the finger portion 532. Each tooth-like projection 540 tapers upwardly and outwardly from the inner surface of the finger 532 to define a ledge surface for abutment with corresponding projections in the female portion of the lower clamp member 502. An inner surface of the passageway 512 includes a corresponding set of elongate teeth-like projections 510 that at least partially extend across the inside of the passageway 512. The finger portion 532 is substantially resilient to allow the finger projections 540 to pass over the passageway projections 510 when the upper clamp portion 500 is inserted into the lower clamp portion 502. The passageway 512 is also sized to allow the finger portion 532 to flex outwardly when riding over the passageway projections 510 during insertion. The ratchet-like engagement between the finger portion 532 and the passageway projections 510 allow the clamp portions to securely connect together in a incremental, audible and tactile manner. Each of the projections 510,540 may extend from its respective surface by about around 2 mm to provide a small range take and limited closure force. The passageway 512 may terminate within the lower clamp portion 502 or may extend through the lower clamp portion.

As shown in FIG. 5a, a hinge pin 555 is provided at an opposite side of the upper clamp portion 500 to the finger portion 532. The hinge pin 555 may be integrally formed with the upper clamp portion 500, e.g. by moulding or casting, or may be a separate component secured to the upper clamp portion. For example, the upper clamp portion may be a plastics material and the hinge pin may be stainless steel. A recessed region 557 in the hinge end of the upper clamp portion 500 defines a gap 559 between the body of the upper clamp portion and the hinge pin 555.

As shown in FIG. 5b, a channel region 561 is provided at an opposite side of the lower clamp portion 502 to the passageway 512. The channel region 561 is an integral part of the lower clamp portion. The channel region 561 is oriented substantially horizontally and in a direction substantially parallel with a cable locatable in the clamp. The channel region 561 is substantially resilient and has an elongate opening 563 that is smaller than a diameter of the hinge pin 555 to provide a snap-fit when the hinge pin 555 is pushed into the channel region 561. Once inserted into the channel region 561, the hinge pin 555 defines a substantially horizontal hinge axis 565 to allow the upper clamp portion 500 to rotate with respect to the lower clamp portion 502. In this manner, the upper clamp portion 500 can be rotated away from the lower clamp portion 502, a cable located on the lower clamp portion 502, and then the upper clamp portion 500 can be rotated towards the lower clamp portion 502 and the finger portion 532 inserted into the passageway 512 until the upper clamp portion 500 engages the cable located securely in the clamp. The projections 510,540 of the passageway 512 and finger 532 provide the ratchet mechanism for incrementally and securely connecting the clamp portions 500,502 together.

Figure 6:
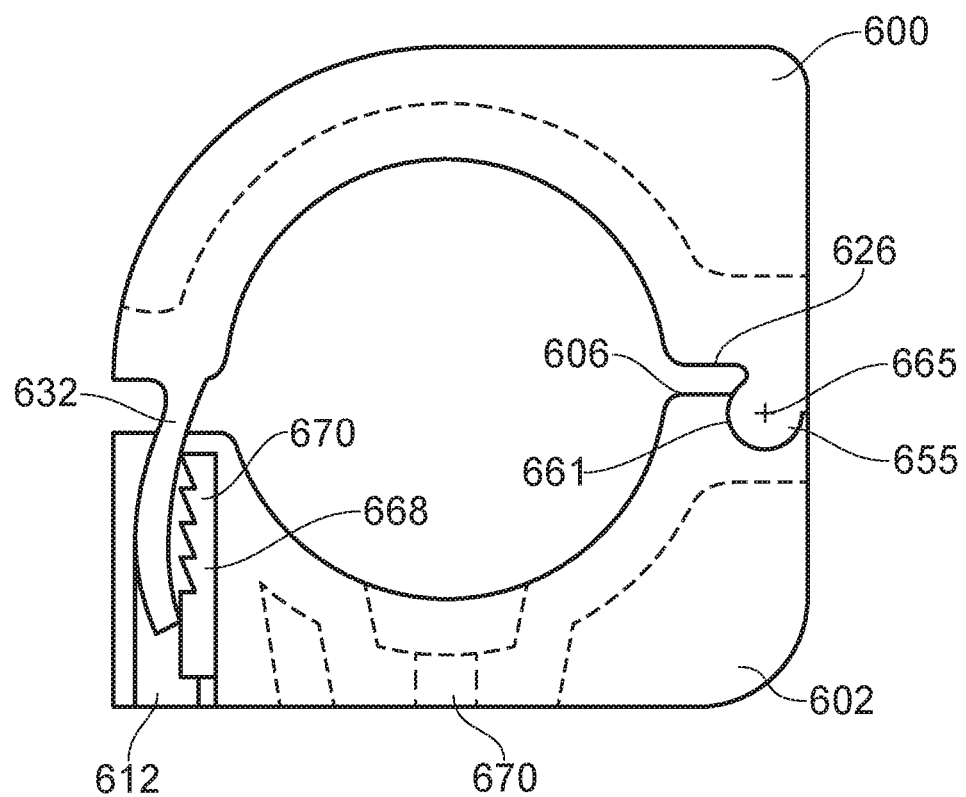
FIG. 6 illustrates a clamp according to a further embodiment of the present invention.

A connected clamp according to certain embodiments of the present invention is shown in FIG. 6. As illustrated, the finger portion 632 may be substantially curved to accommodate the rotatable movement about the hinge axis 665 and into the passageway 612. Likewise, the passageway projections 610 may be located on a correspondingly curved path to engage with the finger projections 640 as the finger 632 moves into the passageway 612. The passageway projections 610 may be integrally formed with the lower clamp portion 602 or may be provided on a separate insert formation 668 secured in the passageway 612. Such an insert formation 668 may be the same or a different material as the lower clamp portion. The lower clamp portion 602 may include a countersunk through bore 670 for receiving a bolt, screw or the like, to attach the lower clamp portion to a suitable support surface (not shown). The channel region 661 is integrally formed in the upper surface 606 of the lower clamp portion 602 and the hinge pin 655 is integrally formed as an elongate rib that extends from the lower surface 626 of the upper clamp portion 600. In a similar manner to the clamp as shown in FIGS. 5a and 5b, the hinge pin 655 snaps into the channel region 661 to form the hinge about which the clamp portions may rotate.

A clamp according to certain embodiments of the present invention may be hingedly connected together during manufacture for later use or the clamp portions may be provided separately and hingedly connected on site. It will also be understood that a keeper element, for example as shown in FIG. 4b, may be utilised with a hinged embodiment of the present invention. Furthermore, the finger and passageway, and hinge pin and hinge channel, may be any suitable shape and size to provide the desired function in accordance with certain embodiments of the present invention.

Figure 7:
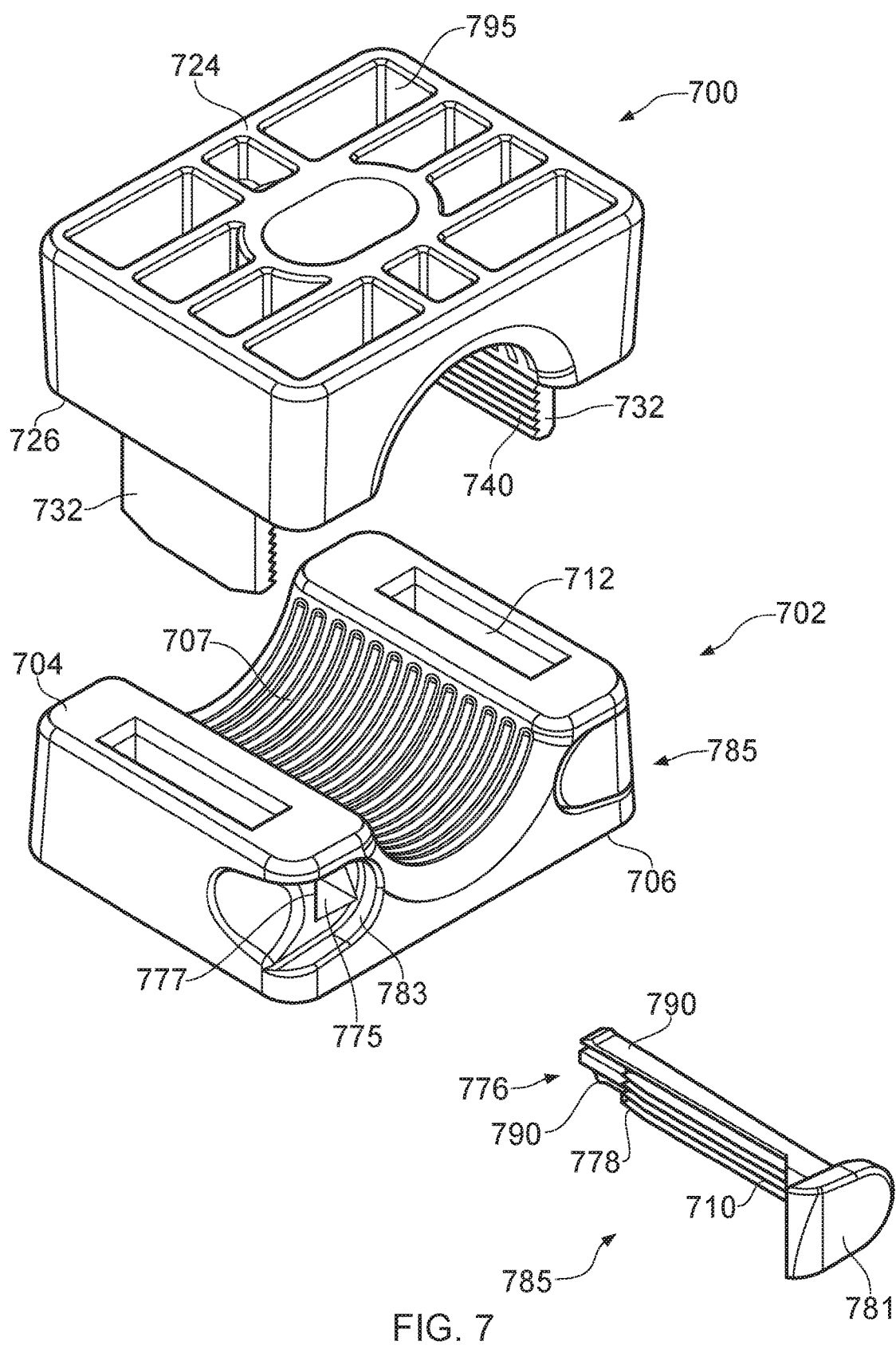
FIG. 7 illustrates a clamp according to a further embodiment of the present invention.

A further clamp according to certain embodiments of the present invention is illustrated in FIG. 7. The clamp includes an upper clamp portion 700 having a pair of resilient finger portions 732 extending from a lower surface 726 of the upper clamp portion 700 for receipt into corresponding passageways 712 in a lower clamp portion 702. The passageways 712 are substantially slot-like in cross section and extend at least partially into the lower clamp portion 702 from an upper surface 704 of the lower clamp portion 702. The lower clamp portion 702 includes a slotted keyway 775 at each end region which are each oriented substantially in parallel with a cable locatable in the clamp such that each slotted keyway 775 intersects a corresponding one of the vertically oriented slotted passageways 712. Each slotted keyway 775 defines an opening 777 in the respective end region of the lower clamp portion 702 and is configured to slideably receive an elongate keeper element 785, as shown in FIG. 7. Each keyway 775 extends at least partially through the lower clamp portion 702 to define a slotted opening 777 at each end region of the lower clamp portion 702.

Each keeper element 785 has a plurality of tooth-like projections 710 extending substantially along the length of the keeper element that are configured to engage with the tooth-like projections 740 of a corresponding one of the fingers 732. After each finger 732 of the upper clamp portion 700 has been inserted into its respective passageway 712 of the lower clamp portion 702, each keeper element 785 is inserted into its corresponding keyway 775 to securely connect the clamp portions 700,702 together.

A leading end region 776 of each keeper element 785 is substantially tapered to aid insertion of the keeper element into its corresponding keyway 775. Likewise, a leading end region 778 of each elongate barb-like projection 710 of each keeper element 785 is also tapered to aid insertion and engagement with the finger projections 740. The leading end region 776 of the keeper element 785 includes a pair of longitudinally oriented elongate and barbed fingers 790 which engage into corresponding recesses (not shown) in an end region of the respective keyway 775 distal to the opening 777. Such an arrangement allows the keeper element 785 to snap securely into position in its respective keyway 775 and provides audible and/or tactile feedback to a user to confirm the keeper element 785 is correctly and securely located in its respective keyway 775. The leading end region of the keeper element 785 may be suitably sized such that it snaps into the opening 777 of its respective keyway 775 whilst being prevented from coming away from the lower clamp portion 702. Such an arrangement may allow each keeper element 785 to be coupled to the lower clamp portion 702 during storage, transit and handling on site reducing the risk of the keeper elements being lost, whilst allowing each keeper element 785 to be easily pushed into engagement with the finger portions 732 of the upper clamp portion 700 during assembly of the clamp around a cable, even if the user is wearing gloves for example and wherein the tactile ability of the user is reduced.

A trailing end region of each keeper element 785 comprises a handle region 781, such as a thumb push region, for at least inserting the keeper element 785 into the keyway 775, and the lower clamp portion 702 may include a corresponding scalloped portion 783 proximal the opening 777 for receiving the handle region 781 of the keeper element 785 when inserted into the keyway 775. This arrangement provides a flush end surface to the lower clamp portion 702 when the clamp portions 700,702 are securely connected together to eliminate any risk of snagging, abrasion or the like of a user's clothing, electrical cable or the like by the assembled clamp which could otherwise result in damage to the user or cable or the like. The scalloped region 783 may be slightly larger than the handle region 781 to allow a tool or a fingernail, for example, to be used to withdraw the keeper element 785 from the keyway 775. Alternatively, each keyway 775 may extend fully through the lower clamp region 702 such that a tool can be used to force the longitudinal fingers 790 together to withdraw them from their corresponding recesses (not shown) to thus allow the keeper element 785 to be slidably removed from its respective keyway and the clamp portions 700,702 moved apart.

In view of the length of each finger portions 732 of the upper clamp portion 700 and the number of equally spaced teeth-like projections thereon 740, the upper and lower clamp portions 700,702 can be connected together in a number of spaced apart positions such that cables having a range of different diameters can be clamped between the upper and lower clamp portions 700,702. As long as each keeper element 785 engages with at least one of the teeth-like projections 740 of the finger portions 732 within the keyways 775, a secure clamping connection will be achieved in a quick and efficient manner.

In an alternative embodiment which is not illustrated, the handle region 781 of each keeper element 785 may have a substantially tapered upper edge region that abuts in use with a correspondingly tapered upper edge region of the corresponding scalloped region 783 of the lower clamp portion 702. When the clamp portions 700,702 are urged apart in use, e.g. in view of the resilient properties of the cable in normal use or during a short-circuit event, the finger projections 740 pull upwardly on the keeper projections 710 to thereby urge the keeper element 785 upwardly. This upward movement is translated to the handle region 781 of the keeper element 785 such that the tapered upper edge region of the handle region 781 engages with the corresponding tapered upper edge region of the scalloped region 783 to urge the keeper element 785 outwardly, i.e. in a lateral direction away from a centre axis of the lower clamp portion 702. This in turn urges the tooth-like projections 710 of each keeper element 785 further against the tooth-like projections 740 of each corresponding finger 732 to thereby increase the security of the clamping connection.

The upper surface 724 of the upper clamp portion 700 and/or the lower surface 706 of the lower clamp portion 702 include a number of inwardly extending recessed portions 795 where material has been purposively removed/spared during the manufacturing process to save on material cost and weight, whilst ensuring the structural integrity and strength of the clamp is not compromised.

Although the embodiments illustrated and described herein show a clamp for retaining a single cable or pipe, the upper and lower clamp portions may take any suitable form to allow more than one cable, such as a trefoil arrangement, to be located and retained in the clamp. The clamps in accordance with certain embodiments of the present invention may also be used with liners and inserts to aid engagement and thus retainment of the clamp portions with one or more cables located in the clamp.

Certain embodiments of the present invention may therefore provide a clamp that is quick and easy to use, particularly when wearing heavy duty work gloves, and which is lightweight, inexpensive and simple to manufacture. Such a clamp desirably requires no bolts or threaded studs to connect the clamp portions together. Therefore, the risk of a cable becoming damaged, and a short circuit occurring, as a result of the integrity of a cable outer sheath being compromised by a threaded bolt or stud is eliminated.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for retaining at least one elongate object, the apparatus comprising:
a first retaining member comprising at least one female portion;
a second retaining member comprising at least one male portion receivable in the at least one female portion, wherein the at least one male portion comprises a first connecting region; and
at least one securing element comprising a second connecting region configured to cooperate with the first connecting region of the at least one male portion,
wherein the first connecting region comprises at least one protrusion or recess for respective cooperation with at least one recess or protrusion of the second connecting region when the securing element is slidably inserted along a keyway of the first retaining member to securely connect the first and second retaining members and retain an elongate object there-between.

2. The apparatus as claimed in claim 1, wherein the first and second connecting regions each comprise at least one tooth element.

3. The apparatus as claimed in claim 2, wherein each of the at least one tooth element is barbed to securely connect the first and second retaining members together.

4. The apparatus as claimed in claim 1, wherein at least a portion of at least one of the male portion and the female portion is substantially resilient.

5. The apparatus as claimed in claim 4, wherein one of the first and second connecting regions is substantially resilient.

6. The apparatus as claimed in claim 1, wherein:
each female portion comprises a slotted passageway in the first retaining member, and
each male portion comprises a finger portion of the second retaining member.

7. The apparatus as claimed in claim 1, wherein the keyway extends at least partially through the first retaining member.

8. The apparatus as claimed in claim 1, wherein the at least one securing element comprises an elongate keeper element configured for insertion into the keyway.

9. The apparatus as claimed in claim 8, wherein a leading end region of the elongate keeper element is tapered and includes at least one longitudinal orientated elongate barbed finger.

10. The apparatus as claimed in claim 8, wherein:
the elongate keeper element comprises a plurality of longitudinally extending projections, and
a leading edge region of each of the plurality of projections is tapered.

11. The apparatus as claimed in claim 8, wherein the elongate keeper element comprises a handle region locatable in a scalloped portion of the first retaining member.

12. The apparatus as claimed in claim 1, wherein the keyway extends into the first retaining member in a direction substantially parallel with an elongate object located between the first and second retaining members.

13. The apparatus as claimed in claim 1, wherein:
the at least one female portion comprises a first female portion disposed at a first side region of the first retaining member and a second female portion disposed at a second side region of the first retaining member, and
the at least one male portion comprises a first male portion disposed at a first side region of the second retaining member and a second male portion disposed at a second side region of the second retaining member.

14. The apparatus as claimed in claim 1, wherein at least one of the first and second retaining members is attachable to a mountable surface.

15. A method of retaining at least one elongate object, the method comprising the steps of:

locating an elongate object on a first retaining member comprising at least one female portion on a second retaining member comprising at least one male portion;

locating a remainder one of the first or second retaining members over the elongate object whereby the at least one male portion of the second retaining member is inserted into the at least one female portion of the first retaining member; and sliding at least one securing element along a keyway of the first retaining member such that a protrusion or recess of a first connecting region of the at least one male portion respectively cooperates with a recess or protrusion of a second connecting region of the at least one securing element to securely connect the first and second retaining members and retain the elongate object there-between.

16. The method as claimed in claim 15, further comprising the step of sliding a leading end region of the securing element through an opening in the first retaining member defined by an end of a keyway.

17. The method as claimed in claim 16, further comprising the step of inserting the at least one securing element into the keyway until barbed fingers at an end region of the securing element engage into corresponding recesses in an end region of the keyway distal to said opening.

18. The method as claimed in claim 15, further comprising the step of inserting the at least one securing element into the keyway until a handle region of the securing element is received in a scalloped portion of the first retaining member.

* * * * *